(12) United States Patent
Takamura et al.

(10) Patent No.: US 8,520,727 B2
(45) Date of Patent: Aug. 27, 2013

(54) VIDEO ENCODING METHOD AND DECODING METHOD, APPARATUSES THEREFOR, PROGRAMS THEREFOR, AND STORAGE MEDIA WHICH STORE THE PROGRAMS

(75) Inventors: Seishi Takamura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 262 days.

(21) Appl. No.: 12/682,701

(22) PCT Filed: Oct. 23, 2008

(86) PCT No.: PCT/JP2008/069257
§ 371 (c)(1),
(2), (4) Date: Apr. 12, 2010

(87) PCT Pub. No.: WO2009/057506
PCT Pub. Date: May 7, 2009

(65) Prior Publication Data
US 2010/0215102 A1    Aug. 26, 2010

(30) Foreign Application Priority Data
Oct. 30, 2007 (JP) .................................. 2007-281556

(51) Int. Cl.
*H04N 7/28* (2006.01)
*H04N 7/32* (2006.01)

(52) U.S. Cl.
USPC ..................................... 375/240; 375/E7.265

(58) Field of Classification Search
None
See application file for complete search history.

(56) References Cited

U.S. PATENT DOCUMENTS 5,991,449 A    11/1999    Kimura et al.
6,125,201 A    9/2000    Zador
(Continued)

FOREIGN PATENT DOCUMENTS

EP    1 833 256 A1    9/2007
JP    3-145887 A    6/1991
(Continued)

OTHER PUBLICATIONS

Linde et al, "An Algorithm for Vector Quantizer Design", IEEE Transactions on Communications, Jan. 1980, pp. 84-95.*

(Continued)

*Primary Examiner* — Gims Philippe
*Assistant Examiner* — Reza Aghevli
(74) *Attorney, Agent, or Firm* — Harness, Dickey & Pierce, P.L.C.

(57) ABSTRACT

An image encoding method for encoding a pixel value of an encoding target by using a predicted value generated by spatial or temporal prediction using a previously-decoded image. The method performs prediction of the pixel value of the encoding target and obtains the predicted value; computes data of a probability distribution which indicates what value an original pixel value has for the obtained predicted value, by shifting, in accordance with the predicted value, difference distribution data of a difference between the original pixel value and the predicted value in predictive encoding, where the difference distribution data is stored in advance; clips the obtained data of the probability distribution so as to contain the data in a range from a lower limit to an upper limit for possible values of the original pixel value; and encodes the pixel value of the encoding target by using the clipped data of the probability distribution of the original pixel value from the lower limit to the upper limit.

10 Claims, 11 Drawing Sheets

(56) References Cited

U.S. PATENT DOCUMENTS

| | | |
|---|---|---|
| 6,865,291 B1 | 3/2005 | Zador |
| 6,909,808 B2 | 6/2005 | Stanek |
| 8,121,190 B2 * | 2/2012 | Li ............................ 375/240.07 |
| 2006/0188020 A1 * | 8/2006 | Wang ........................ 375/240.16 |
| 2006/0291567 A1 * | 12/2006 | Filippini et al. ......... 375/240.24 |
| 2007/0036222 A1 * | 2/2007 | Srinivasan et al. ....... 375/240.18 |

FOREIGN PATENT DOCUMENTS

| | | |
|---|---|---|
| JP | 09-084022 A | 3/1997 |
| JP | 2006-229623 A | 8/2006 |
| RU | 2 162 280 C2 | 1/2001 |
| RU | 2 191 469 C2 | 10/2002 |
| TW | 200627969 A | 8/2006 |
| WO | 03/101117 A1 | 12/2003 |
| WO | 20061095501 A1 | 9/2006 |
| WO | 2007/010690 A1 | 1/2007 |

OTHER PUBLICATIONS

Fischer, "A Pyramid Vector Quantizer", IEEE TRansactions on INformation Theory, Jul. 1986, pp. 568-583.*

T. R. Fischer, "A pyramid vector quantizer", IEEE Trans. Inform. Theory, vol. IT-32, No. 4, pp. 568-583, Jul. 1986.

Y. Linde, A. Buzo and R. M. Gray, "An algorithm for vector quantizer design", IEEE Trans. on Communications, vol. com-28, No. 1, pp. 84-95, Jan. 1980.

Marpe, Detlev, et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 620-636.

* cited by examiner

WHEN OCCURRENCE PROBABILITY OF x IS UNIFORM

DISTRIBUTION CLIPPED BY UPPER AND LOWER LIMITS OF x

VIDEO ENCODING METHOD AND DECODING METHOD, APPARATUSES THEREFOR, PROGRAMS THEREFOR, AND STORAGE MEDIA WHICH STORE THE PROGRAMS

TECHNICAL FIELD

The present invention relates to a technique relating to a highly-efficient image encoding method for efficiently encoding and decoding an image (static image or video (moving) image).

Priority is claimed on Japanese Patent Application No. 2007-281556, filed Oct. 30, 2007, the contents of which are incorporated herein by reference.

BACKGROUND ART

In the encoding of an image (static or video image), a prediction encoding method is a mainstream, in which pixel values of an encoding target are predicted by means of spatial or temporal prediction using previously-decoded pixels.

For example, in 4×4 block horizontal intra prediction in H.264/AVC, a 4×4 block from pixel A to pixel P (described as "A . . . P", similar forms will be used in other descriptions) as an encoding target is predicted horizontally using previously-decoded adjacent pixels a . . . d on the left side, as shown below:

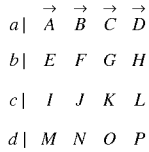

That is, horizontal prediction is performed as follows:
A=B=C=D=a
E=F=G=H=b
I=J=K=L=c
M=N=O=P=d Next, the prediction residual is computed as follows:

| A-a | B-a | C-a | D-a |
|---|---|---|---|
| E-b | F-b | G-b | H-b |
| I-c | J-c | K-c | L-c |
| M-d | N-d | O-d | P-d |

After that, orthogonal transformation, quantization, and entropy encoding are executed so as to perform compressive encoding.

Similar operation is performed in motion-compensated prediction. That is, in 4×4 block motion compensation, a 4×4 block A' . . . P' as a result of prediction of A . . . P by using another frame is generated as follows:
A' B' C' D'
E' F' G' H'
I' J' K' L'
M' N' O' P'

Then, the prediction residual is computed as follows:

| A-A' | B-B' | C-C' | D-D' |
|---|---|---|---|
| E-E' | F-F' | G-G' | H-H' |
| I-I' | J-J' | K-K' | L-L' |
| M-M' | N-N' | O-O' | P-P' |

After that, orthogonal transformation, quantization, and entropy encoding are executed so as to perform compressive encoding.

For the upper-left position (as an example) of the block, a corresponding decoder obtains a predicted value A' and a decoded value (A-A') of the prediction residual, and acquires an original pixel value A as the sum of the above-obtained values. This is a reversible case. However, even in an irreversible case, a decoder obtains a prediction residual decoded value (A-A'+Δ) (Δ is an encoding noise), and acquires (A+Δ) by adding a predicted value A' to the above-obtained value.

The above explanation is applied to 16 (i.e., 4×4) pixel values. Below, a one-dimensional form based on a simplified concept will be shown. Also below, a popular 8-bit pixel value is employed. Therefore, the pixel value is an integer within a range from 0 to 255 (i.e., including 256 integers). Similar explanations can be applied to other pixel values other than the 8-bit pixel value.

Now it is assumed that x denotes a pixel value as an encoding target, and x' denotes a predicted value thereof. Since x' is close to x, the prediction residual (x-x') can be within a range from -255 . . . 255, and concentrates at values in the vicinity of 0, so that the number of large absolute values is relatively small. This relationship is shown in a graph of FIG. 1.

Since the information amount of biased distribution is smaller than uniform distribution, it may be compressed after the encoding. Conventionally, a highly efficient compression is achieved using such biased distribution.

Non-Patent Document 1 relates to vector encoding which is described in embodiments of the present invention explained later, and discloses a pyramid vector quantization technique where representative vectors are regularly positioned within a space.

Non-Patent Document 2 discloses a vector quantization technique based on an LBG algorithm for optimizing representative vectors of vector quantization by means of learning, so as to irregularly arrange representative vectors in a space.

Non-Patent Document 1: T. R. Fischer, "A pyramid vector quantizer", IEEE Trans. Inform. Theory, vol. IT-32, no. 4, pp. 568-583, July, 1986.

Non-Patent Document 2: Y. Linde, A. Buzo and R. M. Gray, "An algorithm for vector quantizer design", IEEE Trans. on Communications, vol. com-28, no. 1, pp. 84-95, January, 1980.

DISCLOSURE OF INVENTION

Problem to be Solved by the Invention

In conventional techniques, it is assumed here that the predicted value x'=255. Since the pixel value x belongs to 0 . . . 255, the prediction residual x-x'=-255 . . . 0, that is, it should be 0 or smaller.

Therefore, in the relevant prediction residual distribution, almost right half (i.e., positive direction) is not used. If qualitatively describing while disregarding end portions (having a very small occurrence probability) of the distribution, 1 bit is required for indicating information of "which of right and left" (e.g., 0 for right and 1 for left) because the distribution is symmetrical in the left-to-right direction. When the right-half distribution is not used (where there is a part exceeding a possible value range), the above 1 bit is originally needless. Also, when the predicted value x'=0, almost left half of the relevant prediction error distribution is not used, and the "1 bit" is originally unnecessary.

The above relationships are shown in FIG. 2. In each diagram shown below, the possible range for a pixel value or a prediction error is indicated by dashed lines.

For qualitative description, $p_w(d)$ is defined, which denotes a probability distribution extending in the left-to-right direction.

[Formula 1]

$$\sum_{d=-255}^{255} p_w(d) = 1 \quad (1)$$

Actually, values in the right half are never used. Therefore, the true distribution of "error d" is twice as much as $p_w$.

$p_c(d) = 2p_w(d)$ (when $d \leq 0$)

$p_c(d) = 0$ (when $d > 0$) (2)

[Formula 2]

$$\sum_{d=-255}^{255} p_c(d) = \sum_{d=-255}^{0} p_c(d) = 1 \quad (3)$$

When regarding $p_w$ as occurrence probability, the average entropy $H_w$ is estimated as follows.

[Formula 3]

$$H_w = -\sum_{d=-255}^{0} p_c(d)\log_2 p_w(d) \quad (4)$$

The average entropy computed using a true occurrence probability is as follows.

[Formula 4]

$$-\sum_{d=-255}^{0} p_c(d)\log_2 p_c(d) = -\sum_{d=-255}^{0} p_c(d)\log_2(2p_w(d)) \quad (5)$$

$$= -\sum_{d=-255}^{0} p_c(d)(\log_2 p_w(d) + 1) \quad (6)$$

$$= -\sum_{d=-255}^{0} p_c(d)\log_2 p_w(d) - \quad (7)$$

$$\sum_{d=-255}^{0} p_c(d)$$

$$= H_w - 1 \quad (8)$$

However, in conventional encoding, only a difference (x-x') is targeted, and thus it is impossible to delete the useless "1 bit".

This is because:
(i) the difference (x-x') loses information of the predicted value x'; and
(ii) (for multidimensional cases) since the difference (x-x') is subjected to orthogonal transformation, the possible range of x in a space after the transformation should also be transformed, so that it is very difficult to determine an excess (over a possible value range) in a multidimensional distribution.

In light of the above problems, an object of the present invention is to improve encoding efficiency of predictive encoding, by not computing the difference between an original pixel value and a predicted value therefor when performing temporal and spatial prediction (similar to conventional techniques), and encoding the original pixel value based on a distribution corresponding to the original pixel value in consideration of an above-described "excess" for the distribution.

Means for Solving the Problem

The present invention is applied to predictive encoding for encoding a pixel value of an encoding target (the value may be associated with a pixel block) by using a predicted value generated by means of spatial or temporal prediction (motion compensation) using a previously-decoded image. In order to solve the above problems, a main feature of the present invention is to encode the value of an encoding target pixel (or pixel block) by using a conditional distribution for the predicted value of the relevant pixel value in consideration of the upper and lower limits of possible values of the pixel value.

The upper and lower limits of possible values of the pixel value correspond to upper and lower limits of possible values of a pixel in a digital image. In an 8-bit image which is most popularly used, the upper and lower limits are 255 and 0, while they are 1023 and 0 for a 10-bit image.

It is no problem to assume that no pixel having a value (e.g., 2000) larger than the upper limit or a value (e.g., −1) is present in the original image. This is the consideration of the upper and lower limits, and the present invention improves the efficiency of the encoding by using such a matter.

The conditional distribution for the predicted value of a pixel value is a probability distribution which indicates what value an original pixel value x has for a predicted value x' obtained for a pixel.

The "conditional" is equal to that the predicted value is x'.

In mathematics, the above is represented by $P_r(x|x')$, which generally has a bell form whose peak is x'.

The distribution of x under the condition that the predicted value is x' and (of course) the distribution of x without such a condition are always included within a range from the lower to the upper limits (e.g., corresponding to integers from 0 to 255 for an 8-bit image) of the relevant pixel.

Additionally, when performing the prediction of the present invention in block units, vector quantization can be used for encoding a conditional distribution of a pixel block value obtained by block prediction.

Effect of the Invention

In accordance with the present invention, when processing a difference between a predicted value and an original pixel value, no "absence of the predicted value as important information" in the conventional method occurs, but the predicted value is fully used for the encoding, thereby encoding an image (static image or video image) with a reduced amount of code.

Figure 1:
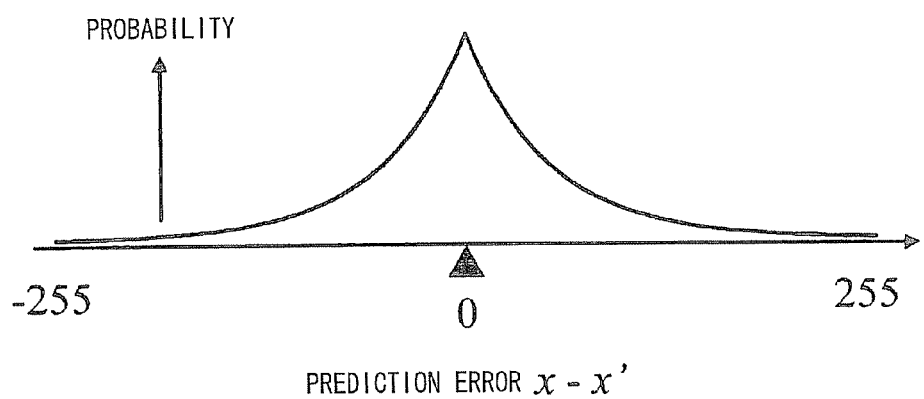
FIG. 1 is a diagram showing a difference distribution for a pixel value.

REFERENCE SYMBOLS 300 signal terminal
301 pixel value predictor
302 predicted value storage memory
303 difference distribution storage memory
304 adder and clipper
305 representative vector designer
306 original pixel value storage memory
307 vector quantizer
308 quantization index encoder
309 output terminal Best Mode for Carrying Out the Invention The general concept of the present invention will be concretely and simply explained.

Figure 9:
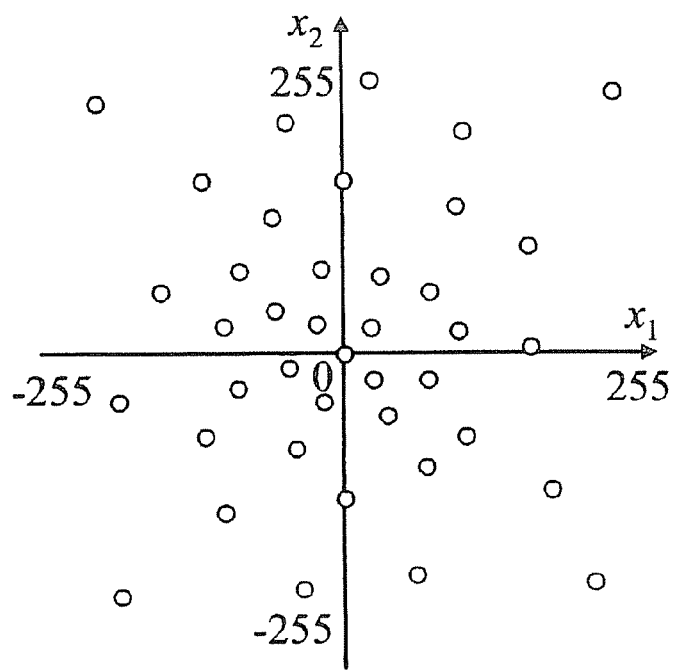
FIG. 9 is a schematic diagram showing differential vector quantization based on an LBG algorithm.

If it is not known which of four values $\{-2, -1, 1, 2\}$ a signal d has (where equal probability of 25% is assumed), "2 bit" is necessary for encoding this signal. FIG. 1 shows this case as a probability distribution (FIG. 9 shows an example of a corresponding two-dimensional case).

Figure 2:
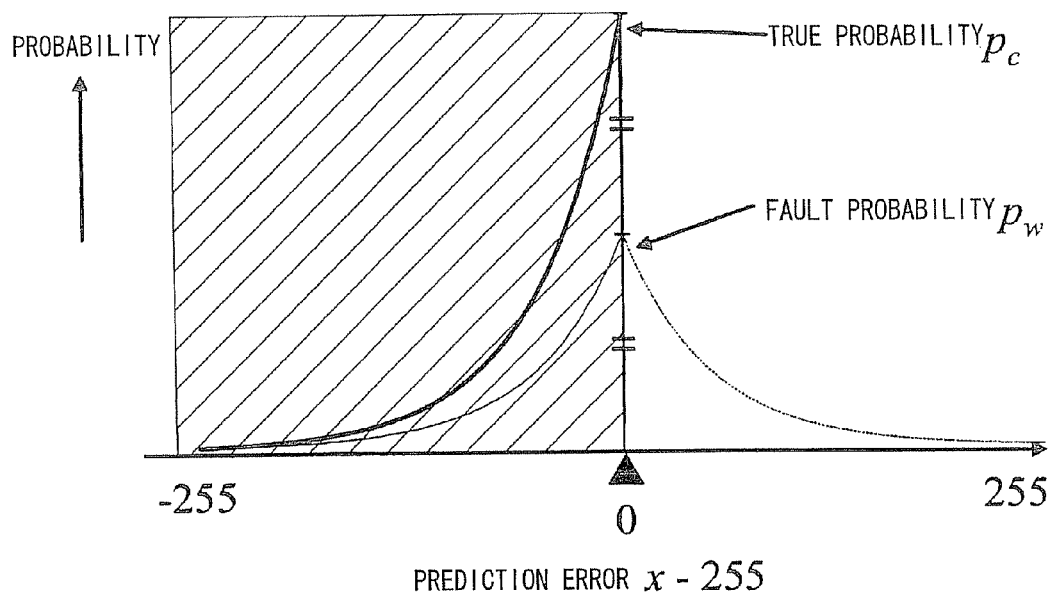
FIG. 2 is a diagram showing a pixel value difference distribution when the predicted value is 255.
Figure 11:
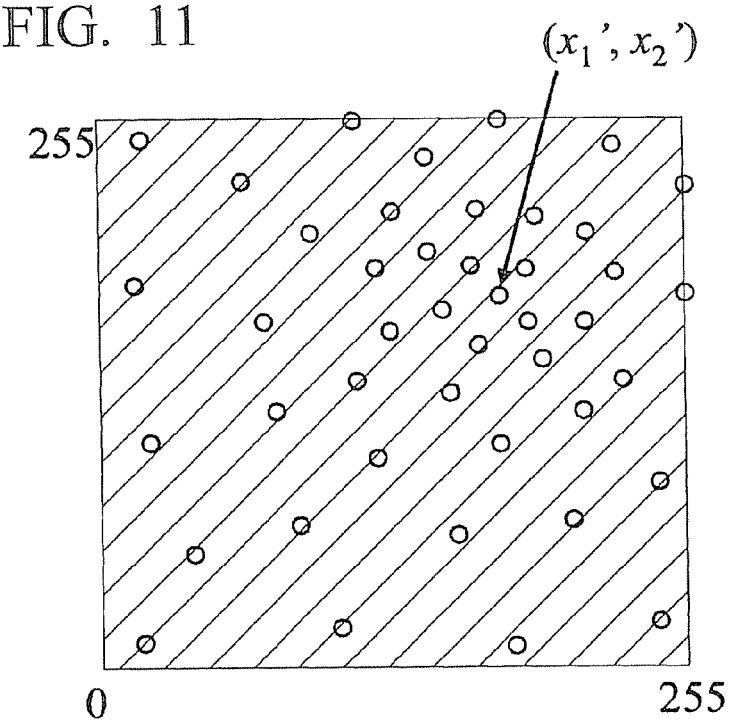
FIG. 11 is a schematic diagram showing vector quantization for specific predicted values $(x_1', x_2')$ by means of a method in accordance with the present invention.

If it is known that the signal d is positive, only two values $\{1, 2\}$ are possible, and encoding can be performed using "1 bit". FIG. 2 shows this case as a probability distribution (FIG. 11 shows an example of a corresponding two-dimensional case).

Similar explanations can be applied to predictive encoding for a static or video image.

When an image signal x $(0 \leq x)$ has a predicted value x', the distribution of prediction error d $(=x-x')$ varies in accordance with the predicted value x'.

For example, if x'=0, then $0 \leq d_0$, that is, d does not have a negative value. If x'=255, then $d_0 \leq 0$, that is, d does not have a positive value (refer to FIG. 2 again for the concept thereof).

As described above, before the encoding or decoding, the range where d is present can be narrowed by referring to the predicted value x', which should improve the encoding efficiency.

The process of narrowing the presence range of d equals to normalization of the range of "x'+d" (for an 8-bit image) into 0 ... 255.

Figure 12:
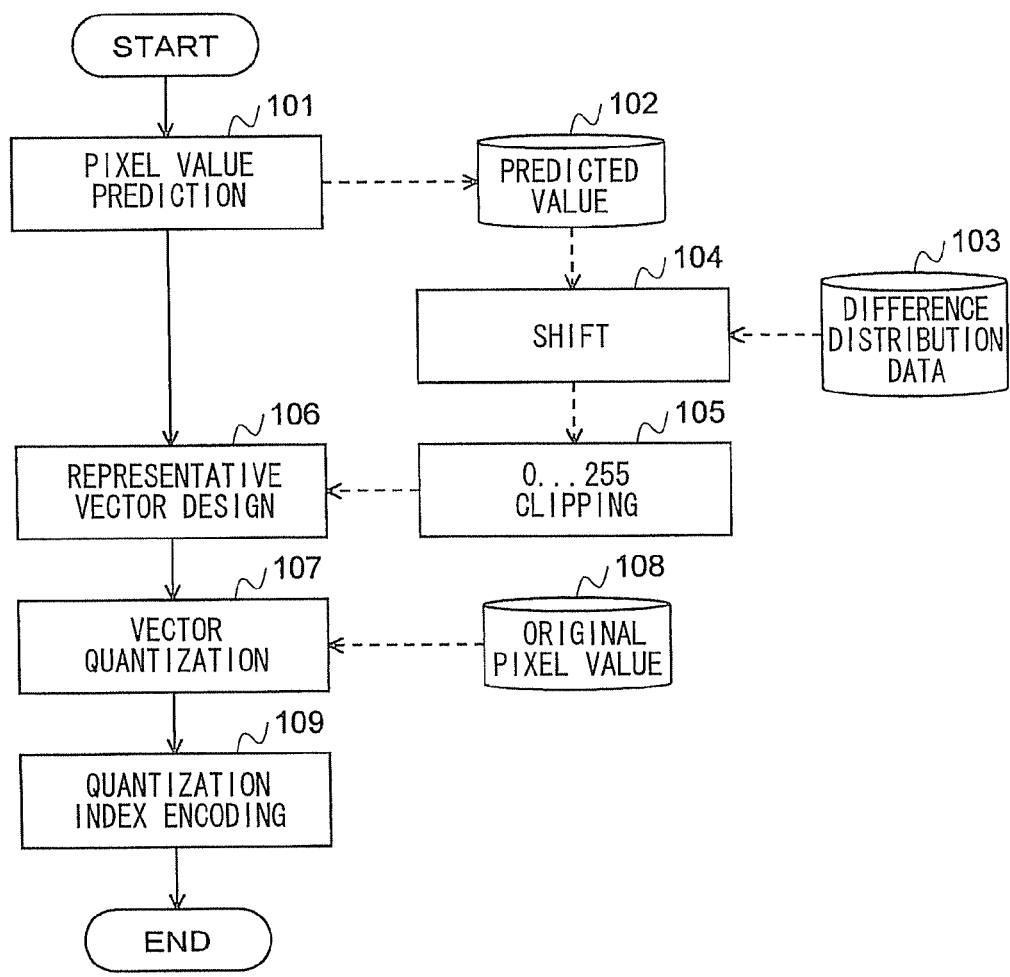
FIG. 12 is a flowchart of an encoding process in an embodiment of the present invention.
Figure 15:
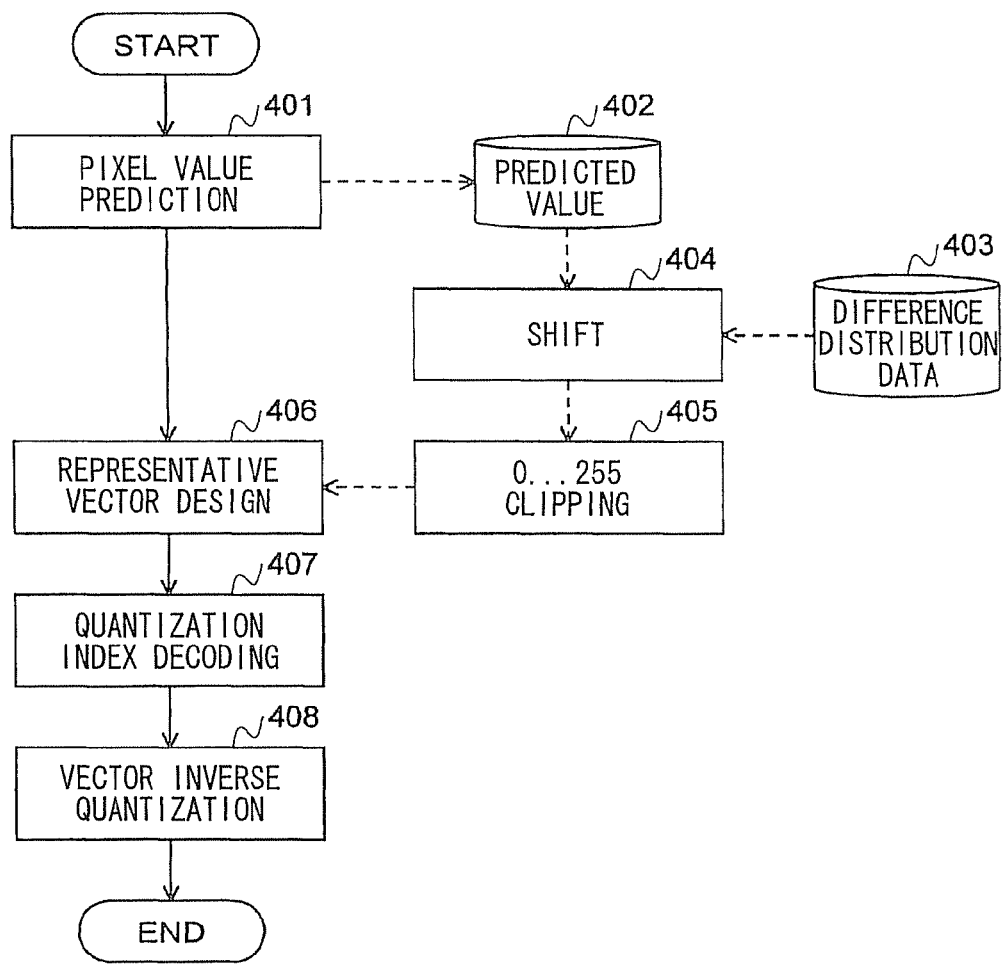
FIG. 15 is a flowchart of a decoding process in the embodiment.

This process also corresponds to a clipping step 105 in an encoding method shown in a flowchart of FIG. 12, and a clipping step 405 in a decoding method shown in a flowchart of FIG. 15.

In addition, optimum representative vectors can be adaptively designed by designing a representative vector for each block as a prediction unit (this process corresponds to a representative vector design step 106 in the encoding method shown in the flowchart of FIG. 12, and a representative vector design step 406 in the decoding method shown in the flowchart of FIG. 15).

After narrowing the encoding target signal as described above, an ordinary encoding process is executed so that a code shorter (i.e., having a higher level of encoding efficiency) than a conventional code is output (see a quantization index encoding step 109 in the flowchart of FIG. 12).

The pixel value prediction is employed as motion compensation or intra prediction is existing encoding techniques MPEG-1, MPEG-2, MPEG-4, and H.264/AVC (see step 101 in the encoding method shown in the flowchart of FIG. 12, and step 401 in the decoding method shown in the flowchart of FIG. 15). The present invention can be broadly applied to any scene where such prediction is used, and contribute to improvement of encoding efficiency.

In the existing prediction encoding techniques, encoding is performed on an assumption that the prediction error can always be positive or negative (this concept is shown in FIG. 9).

Next, the conceptual function of embodiments of the present invention will be explained in detail.

An example of performing prediction in pixel block units and applying vector quantization to the encoding of a conditional distribution of a pixel block value by means of the block prediction will be explained. For a pixel having a predicted value x', a basic concept of performing the encoding by using a probability distribution which indicates the actual value of the original pixel value x is also applied to the encoding performed in pixel units.

When the Distance Measure is $L^\infty$ Norm

Figure 3:
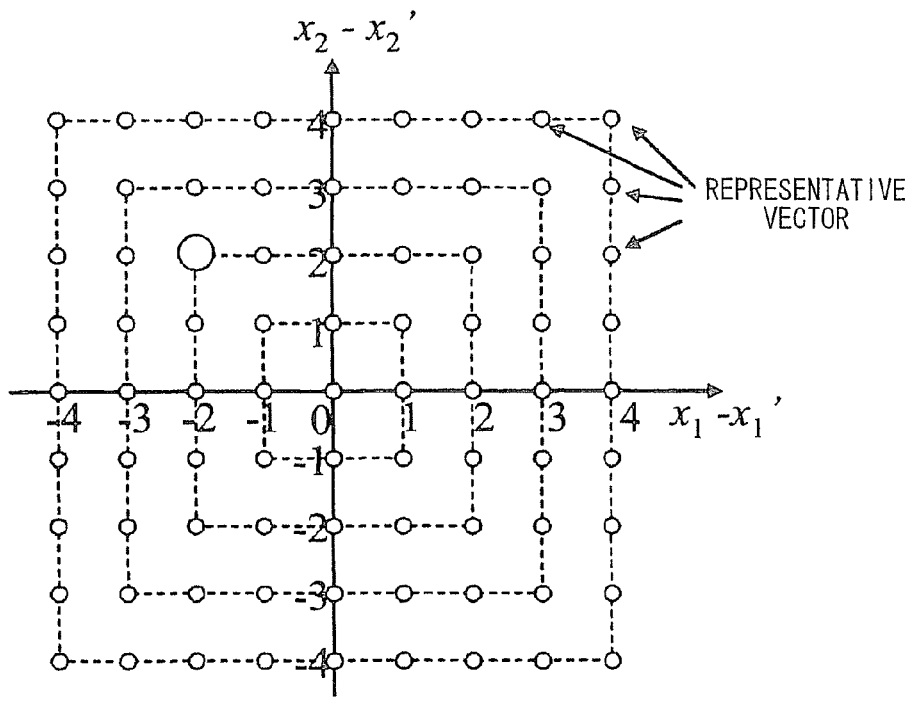
FIG. 3 is a diagram showing a simple vector quantization (in consideration of the relevant difference).

An example of quantization and encoding in a two-dimensional space will be explained with reference to FIG. 3. FIG. 3 is a schematic diagram showing a most simple two-dimensional lattice quantization. The distance measure from the origin is computed based on the $L^\infty$ norm (i.e., maximum value of absolute coordinate values).

For example, point (0,3) and point (−2,−3) have the same $L^\infty$ norm.

In FIG. 3, it is assumed that the points (representative vectors to which discrete data belongs after the vector quantization) connected via dotted lines have the same $L^\infty$ norm, and appear with equal probability.

In FIG. 3, it is also assumed that the original pixel values of two adjacent pixels are $x_1=253$ and $x_2=102$, and corresponding predicted values are $x_1'=255$ and $x_2'=100$. Therefore, each difference is "$x_1-x_1'=-2$" and "$x_2-x_2'=2$".

It is assumed here that the occurrence probability of "$L^\infty$ norm=2", to which the difference vector (−2, 2) (corresponding to the original pixel values) belongs, is 0.3.

Since there are 16 representative vectors whose $L^\infty$ norm is 2, the amount of information required for encoding the original pixel values is as follows:

$$-\log_2 0.3 + \log_2 16 = 5.737 [\text{bit}] \quad (9)$$

Next, the amount of code generated when the prediction error is not computed in the present invention will be evaluated. The concept thereof is shown in FIG. 4.

Figure 4:
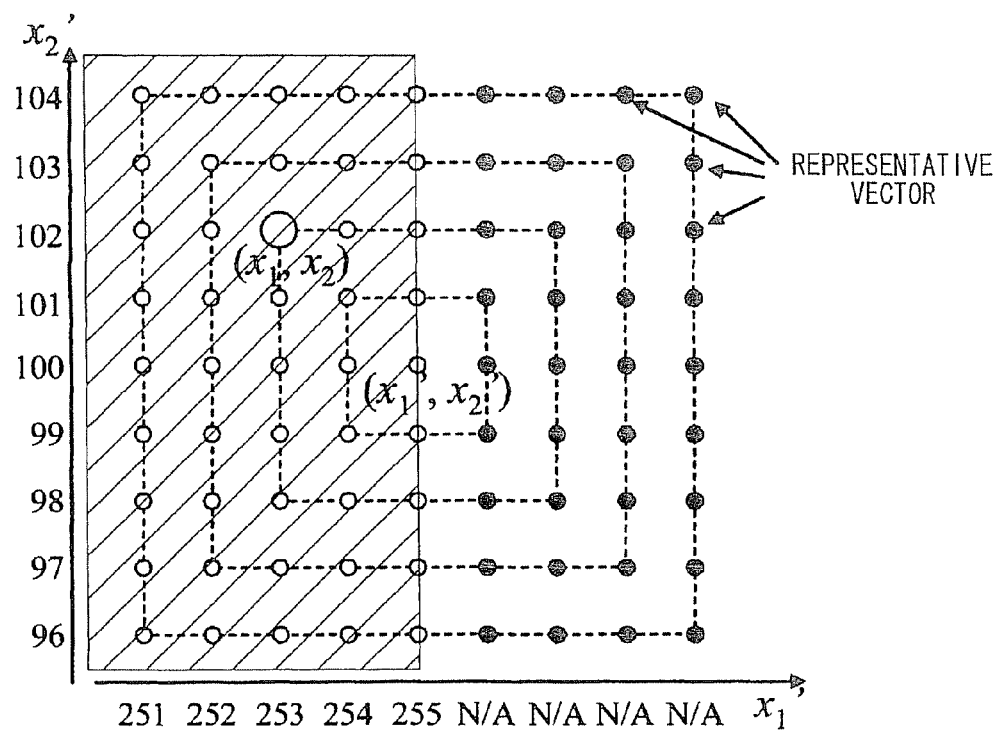
FIG. 4 is a diagram showing a simple vector quantization (without consideration of the relevant difference).

In FIG. 4, the representative vectors indicated by white circles (○), which belong to a shaded part, may have original pixel values, while the representative vectors indicated by black circles (●), which belong to a part outside the shaded part, never have the original pixel values.

The center is the predicted value $(x_1', x_2')=(255, 100)$. Similar to the above explanation, it is assumed that the probability that the $L^\infty$ norm from the center is 2 is 0.3.

Since 9 representative vectors belong to the area satisfying the above, the information amount required for encoding the original pixel values is as follows:

$$-\log_2 0.3 + \log_2 9 = 4.907 [\text{bit}] \quad (10)$$

which is lower by 0.83 bit than the case of computing the relevant difference (see formula (9)).

The Number of Representative Vector Points on a Plane Having a Constant Norm

Figure 5:
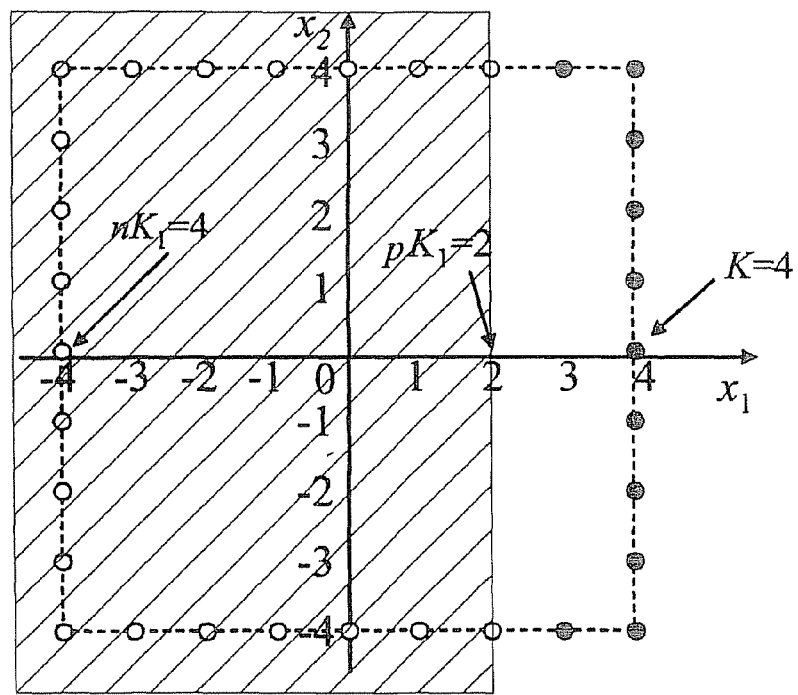
FIG. 5 is a diagram showing representative vectors corresponding to an $L^\infty$ norm of 4.

FIG. 5 shows representative vectors corresponding to an $L^\infty$ norm of 4 in a two-dimensional space.

When N denotes the dimension and K denotes the norm, the number N(L,K) of representative vectors is given by the following formula:

$$N(L,K) = (2K+1)^L - (2K-1)^L \quad (11)$$

In the example of FIG. 5, the following result is obtained:

$$N(2,4) = 9^2 - 7^2 = 81 - 49 = 32$$

In the encoding, the following information amount is required to specify representative vectors after the norm is specified.

$$\log_2 N(L,K) [\text{bit}] \quad (12)$$

In addition, FIG. 5 has an "excess part" (having no possibility for the original pixel values) indicated by black circles (●). In order to compute the number of white circles (○) by omitting the number of black circles, for respective dimensions of $(x_1, x_2, \ldots, X_L)$ having upper limits $({}_pK_1, {}_pK_2, \ldots, {}_pK_L)$ and lower limits $(-{}_nK_1, -{}_nK_2, \ldots, -{}_nK_L)$, the following relationship is defined:

$$0 \leq {}_nK_i, {}_pK_i \leq K (i=1 \ldots L)$$

When there is no excess part, the relationship is:

$$K_i(\text{upper limit, lower limit}) = K$$

Here the number of white circles (○) is indicated by:

$$N'(L, K, {}_nK_1, \ldots, {}_nK_L, {}_pK_1, \ldots, {}_pK_L)$$

The number is computed by:

[Formula 5]

$$N'(L, K, {}_nK_1, \ldots, {}_pK_1, \ldots) = \prod_{i=1}^{L}({}_nK_i + {}_pK_i + 1) - \prod_{i=1}^{L}(f(K,{}_pK_i) + f(K,{}_nK_i) + 1) \quad (13)$$

In the above formula:

$$f(K,K')=K'-1 \text{ (when } K'=K)$$
$$f(K,K')=K' \text{ (when } K'<K) \quad (14)$$

Since $L=2$, $K=4$, ${}_nK_1=4$, ${}_nK_2=4$, ${}_pK_1=2$, and ${}_pK_2=4$ in the example of FIG. 5:

$$N' = (2, 4, 4, 4, 2, 4)$$
$$= (4+2+1)(4+4+1) - (4-1+2+1)(4-1+4-1+1)$$
$$= 63 - 42$$
$$= 21$$

The degree of entropy reduction in accordance with the method of the present invention is evaluated by:

$$\log_2 32 - \log_2 21 = 0.608 [\text{bit}]$$

Figure 6:
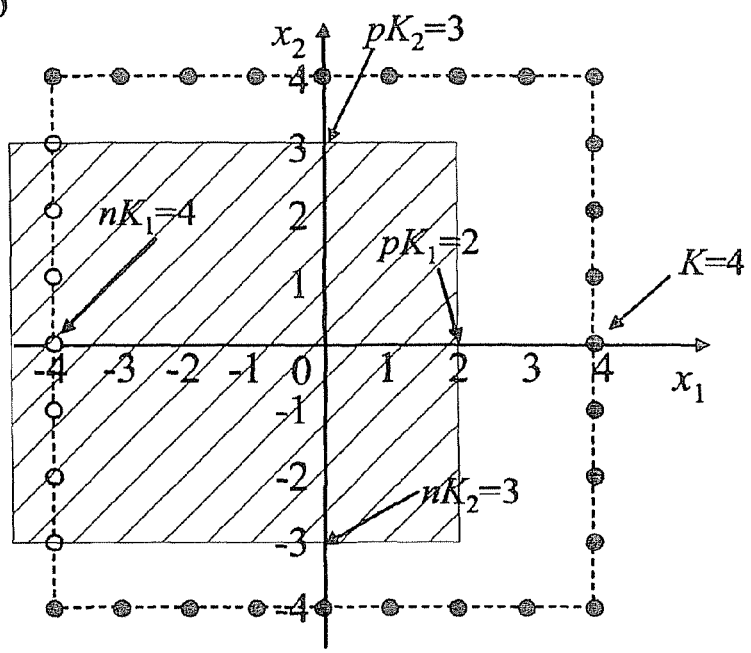
FIG. 6 is a diagram showing representative vectors (for another predicted value) corresponding to an $L^\infty$ norm of 4.

Next, FIG. 6 shows an example having a different predicted value.

Since $L=2$, $K=4$, ${}_nK_1=4$, ${}_nK_2=3$, ${}_pK_1=2$, and ${}_pK_2=3$:

$$N'(2, 4, 4, 3, 2, 3) = (2+4+1)(3+3+1) - (2+4-1+1)$$
$$(3+3+1)$$
$$= 49 - 42$$
$$= 7$$

Therefore, the area of the excess part is considerably reduced.

When the Distance Measure is $L^1$ Norm

Below, a so-called pyramid vector quantization case, in which the distance from the origin corresponds to an $L^1$ norm, will be explained with reference to FIG. 7. Similar to the above example, each dotted line indicates a plane having a uniform probability, and a shaded part indicates an area of possible pixel values (0 . . . 255).

Figure 7:
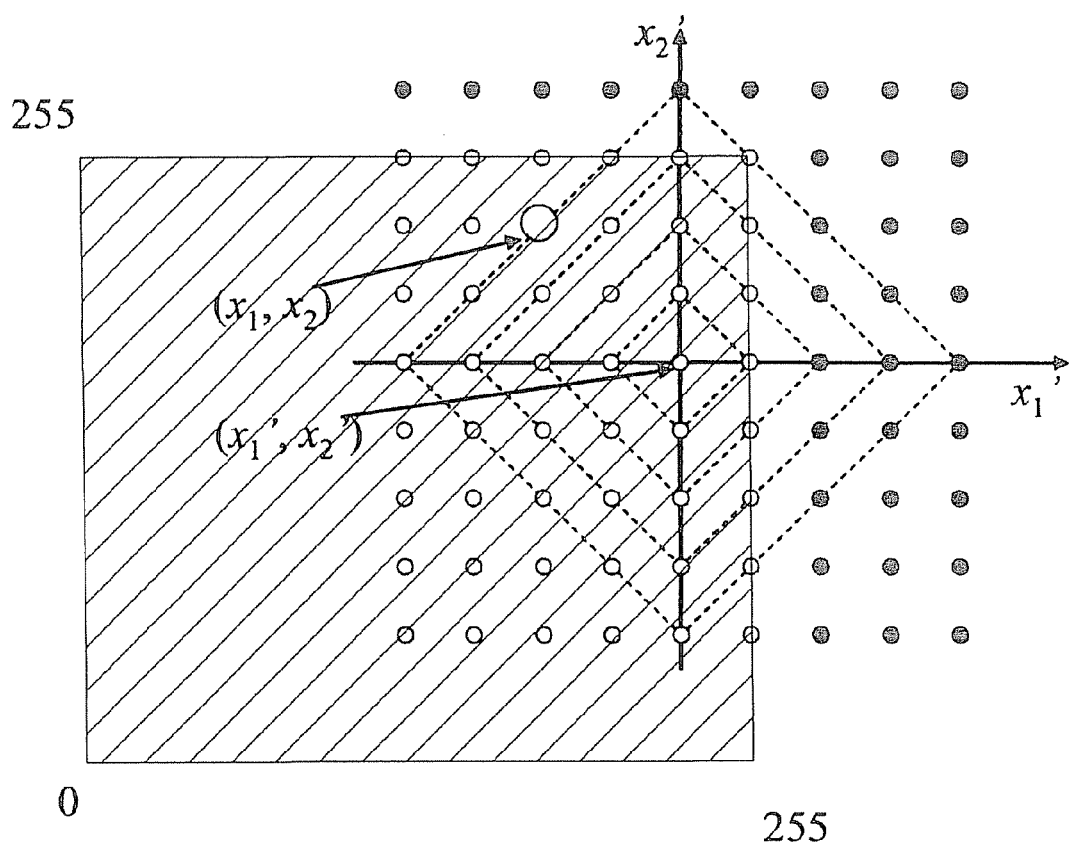
FIG. 7 is a diagram showing a pyramid vector quantization (in consideration of the relevant difference).

In FIG. 7, $(x_1, x_2)$ indicated by a large circle (○) is the original pixel, and the number of representative vectors belonging to the relevant norm (i.e., "4" in FIG. 7) is 16 which include "out of range" vectors, and there are 10 representative vectors within the relevant range.

In this case, the entropy obtained when computing no difference between the original pixel value and the predicted value (in the present invention) is lower than the case of computing the difference (in conventional methods) by:

$$\log_2 16 - \log_2 10 = 0.678 [\text{bit}] \quad (15)$$

The number of Representative Vector Points on a Plane Having a Constant Norm

Figure 8:
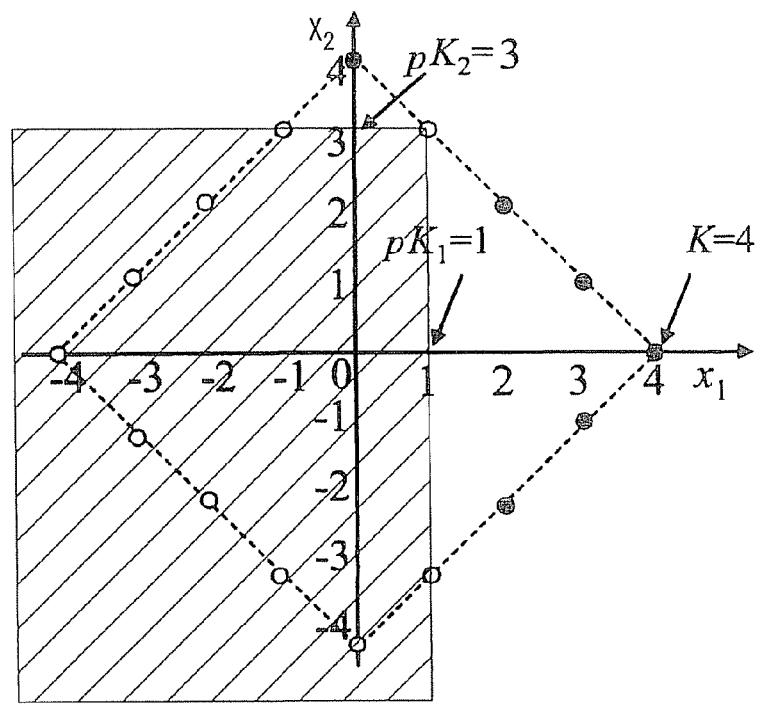
FIG. 8 is a diagram explaining counting of representative vectors in the pyramid vector quantization.

FIG. 8 shows a part where $L^1$ norm is 4 in FIG. 7.

Similar to the above example, N(L,K) indicates the number of representative vectors where $L^1$ norm is K in the L-dimensional pyramid vector quantization, and is computed in a recurrence faun as follows (see Non-Patent Document 1).

When K=1:
N(L, K)=2L
When L=1:
N(L, K)=2
In the other cases:

$$N(L,K)=N(L,K-1)+N(L-1,K-1)+N(L-1,K) \quad (16)$$

Therefore:

$$\begin{aligned} N(2, 4) &= N(2, 3) + N(1, 3) + N(1, 4) \\ &= N(2, 2) + N(1, 2) + N(1, 3) + 2 + 2 \\ &= N(2, 2) + 2 + 2 + 4 \\ &= N(2, 1) + N(1, 1) + N(1, 2) + 8 \\ &= 4 + 2 + 2 + 8 \\ &= 16 \end{aligned}$$

Next, the number of vectors in the "excess part" is considered. For example, five "excess" representative vectors (●) are generated due to $_pK_1=1$, and one "excess" representative vectors are generated due to $_pK_2=3$.

First, for simplification, only $_pK_1=1$ has the relationship of $_pK_1<K$, and the others have the following relationship:

$$_nK_1, K_i = K (i=2, \ldots, L)$$

In such a case, the number M(L,K) of "excess" representative vectors (●) is computed using N in formula (16), as follows:

When K=0:
M(L, K)=1
When L=1:
M(L, K)=1
In the other cases:

$$M(L,K)=(N(L,K-1)+N(L-1,K))/2 \quad (17)$$

Based thereon, the relevant number is computed by M(L, K-$_pK_1$-1).
For L=2, K=4, and $_pK_1=1$ in FIG. 8:

$$\begin{aligned} M(2, 4-1-1) &= M(2, 2) \\ &= (N(2, 2) + N(1, 2))/2 \\ &= (8+2)/2 \\ &= 5 \end{aligned}$$

A similar method can be applied to another dimension. For example, if $_pK_2=3$, the following computation can be performed:

$$M(2,4-3-1)=M(2,0)=1$$

Accordingly, the number of the white circles (o) can be computed as "N–M" where N is the total number of the representative vectors, and M is the number of the excess representative vectors.

In order to accurately compute the "excess" amount as described above, the following conditions should be satisfied:
(i) On an $x_i=K_i$ plane perpendicular to the i-th coordinate axis, $L^1$ norm of all end points is always greater than or equal to K.
(ii) That is, a point at which all coordinate values except for a coordinate axis j, which provides a minimum value between among $|K_j|$ and $|255-K_j|$ (j≠i), are 0 has an $L^1$ norm (i.e., minimum $L^1$ norm among all end points) greater than or equal to K.
(iii) Therefore, the following formula is satisfied.

[Formula 6]

$$\min\left(\min_{j\neq i}|K_j|, \min_{j\neq i}|255-K_j|\right)+|K_i| \geq K \quad (18)$$

As a specific example, in FIG. 8, four corners of a shaded rectangle are "all end points", and all end points are positioned on the line defined by "$L^1$ norm=4" or outside thereof, so that the excess amount can be accurately computed.

Figure 16:
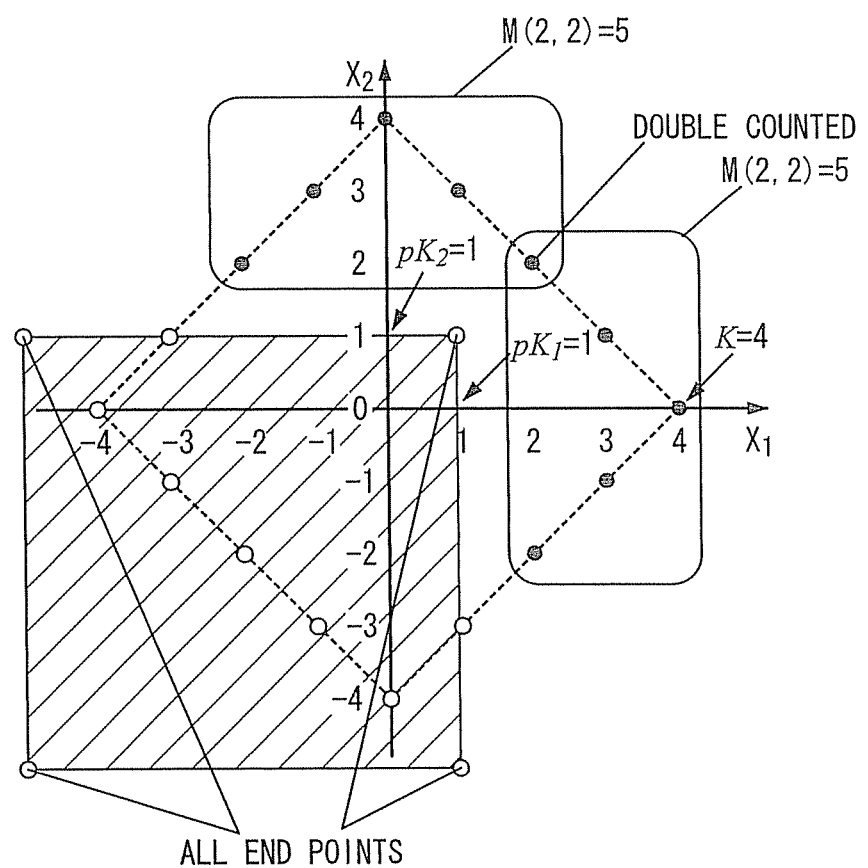
FIG. 16 is a diagram showing an example in which the number of "excess" representative vectors is not accurately computed.

If it is assumed that the shaded part is defined as shown in FIG. 16, there is an end point which is present inside the line of "$L^1$ norm=4" (i.e., end point positioned at $(x_1, x_2)=(1, 1)$), so that there is an "excess" representative vector which is double counted (i.e., representative vector positioned at $(x_1, x_2)=(2, 2)$).

In such a case, the "excess" amount is not accurately computed.

In Ordinary Vector Quantization

In ordinary vector quantization using a well-known LBG algorithm (see Non-Patent Document 2) in which representative vectors are not regularly arranged, the present invention is performed as described below.

FIG. 9 is a schematic diagram showing vector quantization applied to an ordinary (two-dimensional) differential signal. Since the differential signal has a value within –255 . . . 255 in each dimension, representative vectors are also designed so as to cover this range. If the probability that the signal appears in the vicinity of the origin (0,0) is high as for an image predicted differential signal, many representative vectors are present in the vicinity of the origin, while less representative vectors are present in the peripheral area, as shown in FIG. 9.

Figure 10:
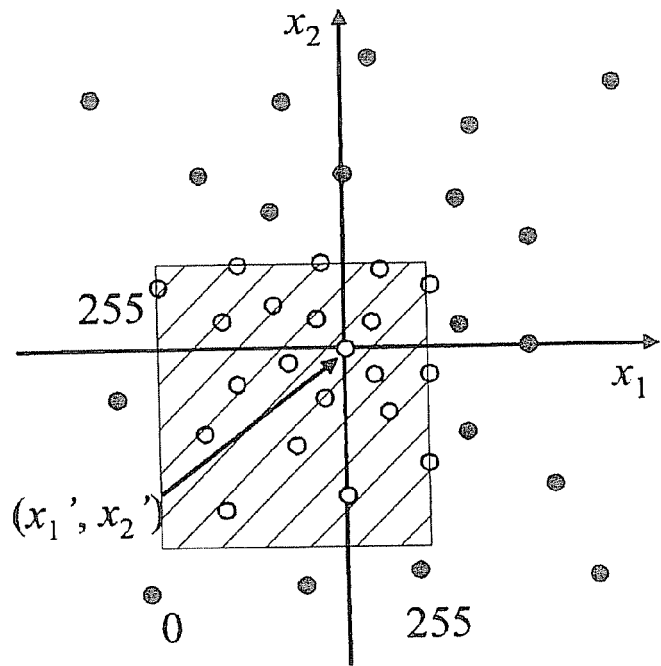
FIG. 10 is a schematic diagram showing differential vector quantization for specific predicted values $(x_1', x_2')$.

FIG. 10 is a diagram corresponding to a conventional encoding method, in which an original signal is encoded using predicted values $(x_1', x_2')$. Since the original signal always have values within 0 . . . 255, representative vectors may be present outside the range. Therefore, similar to the explanation of the one-dimensional encoding, a needless amount of code is generated.

FIG. 11 is a diagram corresponding to the encoding method in accordance with the present invention, in which representative vectors are designed based on the predicted values $(x_1', x_2')$.

Since the design is of course performed within the range of 0 . . . 255 for each dimension (i.e., $0 \leq x_1, x_2 \leq 255$), no "excess" representative vectors (as generated in the conventional method in FIG. 10) are present, thereby performing encoding without a needless amount of code.

Below, an embodiment of the present invention will be explained, in which prediction is embodiment in pixel block units, and vector quantization is applied to the encoding of a conditional distribution of a pixel block value by means of the block prediction.

In the present embodiment, representative vectors for the vector quantization are generated based on data for learning, which is prepared in advance.

Here, only learning data associated with the predicted value x' for an encoding target block may be used. However, the number of data items is small in this case. Therefore, the difference from the original pixel value (i.e., x-x') may be stored is advance, and a value obtained by adding the predicted value to the difference may be used in the learning.

FIG. 12 is a flowchart of the present embodiment, where solid arrows show an operational flow, and dashed arrows show a data flow.

In a pixel value prediction step 101, pixel value prediction of the encoding target block is performed by applying motion compensation or intra prediction to each block as a unit, thereby obtaining a predicted value 102 (vector quantity).

In a shift step 104, the predicted value is added (shifted) to a differential value (separately stored) in difference distribution data 103 (vector quantity). In the next clipping step 105, each vector element is clipped to be within a range of 0 . . . 255. The clipped data functions as original data for learning.

In a representative vector design step 106, representative vectors are designed using the original data for learning, by means of the LBG algorithm or the like (thereby obtaining a result as shown in FIG. 11).

In the next vector quantization step 107, an original pixel value 108 (vector quantity) of the encoding target block is associated with a representative vector closest to the original pixel value.

In the next quantization index encoding step 109, based on the obtained index information of the relevant representative vector is encoded based on the corresponding occurrence probability, by means of entropy encoding such as arithmetic encoding. The obtained code is output, and the operation is completed.

The function of the encoding process shown in FIG. 12 will be explained in a simple example with reference to FIGS. 13A to 13D. For simple illustration, the pixel value is indicated in a one-dimensional space. The original pixel value x is present within a range from 0 to 255.

Figure 13A:
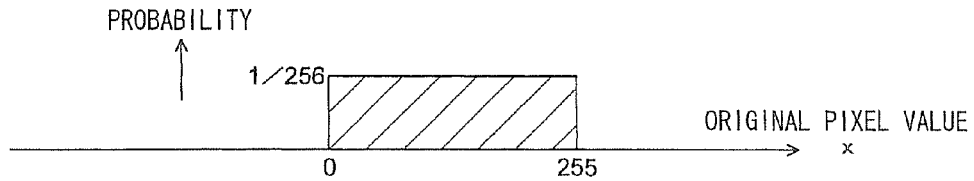
FIG. 13A is a diagram showing a concept that the original pixel value has a uniform occurrence probability.

If each value in this range has the same occurrence probability, each value appears with a probability of 1/256 (see FIG. 13A). Such a value appearing with an equal probability has a high encoding cost.

However, if a predicted value x' of the original pixel value x has been obtained, the probability distribution for possible values of the original pixel value x can be a non-equal probability distribution based on a distribution of known prediction error values. Based on this feature, the present method reduces the encoding cost.

The prediction error value (x-x') as difference between the original pixel value x and the predicted value x' (i.e., differential value) can be within a range from −255 to 255. The distribution of the difference can be obtained by performing a predictive encoding experiment applied to many sample images. Data of the difference distribution is accumulated in advance, so as to store the data.

Figure 13B:
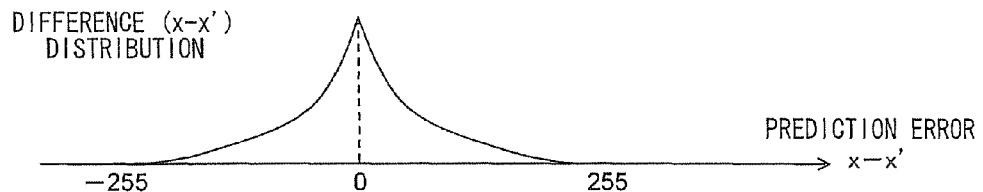
FIG. 13B is a schematic diagram showing a difference distribution between the original pixel value and the predicted value therefor.

The difference distribution is the distribution of the frequency or the probability of each prediction error value, and an example thereof is shown in FIG. 13B. The difference distribution data 103 in FIG. 12 is data (here, vector quantity) corresponding to a distribution as shown in FIG. 13B.

In order to encode the original pixel value x, the predicted value x' is computed in the pixel value prediction step 101.

In the shift step S104, the predicted value x' is added (shifted) to each differential value in the difference distribution data 103, that is, each prediction error value x-x' on the horizontal axis in the difference distribution shown in FIG. 13B. This difference distribution is transformed to a distribution which corresponds to the original pixel value x, as shown in FIG. 13C.

The transformed result corresponds to a probability distribution of possible values of the original pixel value x when the predicted value x' is known.

Figure 13C:
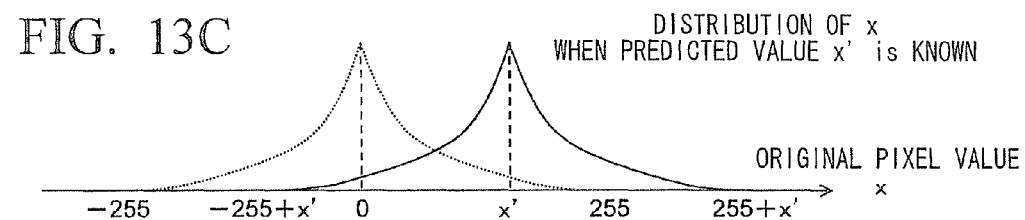
FIG. 13C is a schematic diagram showing a distribution transformed from the difference distribution so as to correspond to the original pixel value.

In the distribution of FIG. 13C, the distribution range of the original pixel value x is −255+x' to 255+x'. However, there is a precondition that the original pixel value x is always present in a range from 0 to 255. Therefore, in the next clipping step 105, as shown in the distribution of the original pixel value x of FIG. 13D, a part below 0 and a part larger than 255 are cut, and the obtained distribution is normalized as needed so as to acquire a probability distribution.

Figure 13D:
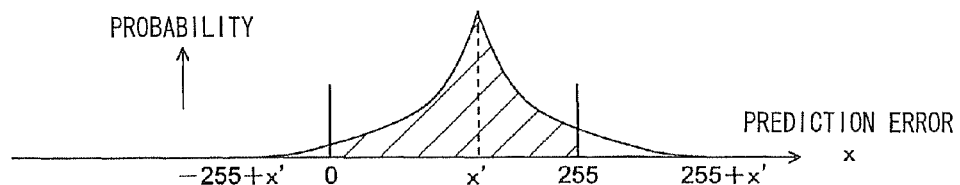
FIG. 13D is a schematic diagram showing a distribution clipped within a range of possible original pixel values.

When encoding the original pixel value x based on the distribution shown in FIG. 13D, a higher degree of encoding efficiency is of course obtained than the encoding based on an equal probability distribution as shown in FIG. 13A, and additionally, a higher degree of encoding efficiency is also obtained than that obtained by the encoding based on a probability distribution having a wide bottom (corresponding to the conventional method) as shown in FIG. 13B.

Vector quantization is an example of efficient encoding under such a probability distribution. Furthermore, in the present embodiment, based on a probability distribution as shown in FIG. 13D, arrangement of quantization representative vectors is determined through steps 106 to 109 in FIG. 12, so as to perform vector quantization.

Figure 14:
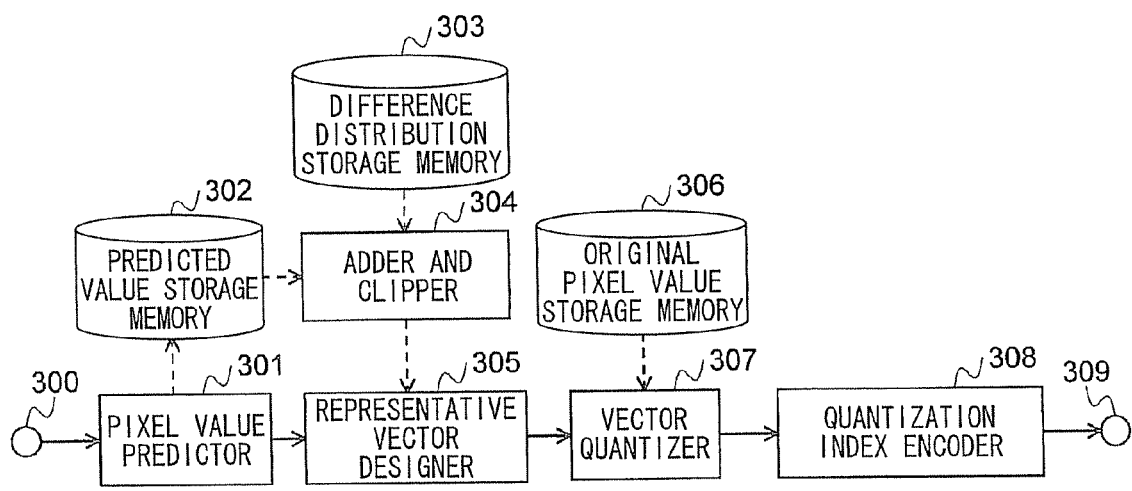
FIG. 14 is a block diagram showing an encoding apparatus of the embodiment.

FIG. 14 is a block diagram showing an encoding apparatus of the present embodiment.

An image original signal and a previously-decoded image signal are input through a signal terminal 300.

An original pixel value of an encoding target block is stored in an original pixel value storage memory 306.

In a pixel value predictor 301, pixel value prediction of the encoding target block is performed by means of motion compensation, intra prediction, or the like, executed in block units, thereby obtaining a predicted value (vector quantity), which is stored in a predicted value storage memory 302.

In an adder and clipper 304, a difference distribution data vector, which has been separately stored in a difference distribution storage memory 303, is added to the predicted value, so as to clip each element of the relevant vector to be included in a range of 0 . . . 255. This functions as the original data for learning.

In a representative vector designer 305, representative vectors are designed using the original data for learning, by means of the LBG algorithm or the like.

Next, the original pixel value (vector quantity) of the encoding target block, which has been stored in the memory 306, is associated by a vector quantizer 307 with the representative vector closest to the original pixel value.

In a quantization index encoder 308, the index information of the obtained representative vector is encoded based on the occurrence probability thereof, by means of entropy encoding such as arithmetic encoding. The obtained code is output through an output terminal 309, and the operation is completed.

FIG. 15 is a flowchart of a decoding process in the present embodiment, where solid arrows show an operational flow, and dashed arrows show a data flow.

In a pixel value prediction step 401, pixel value prediction of the encoding target block is performed by applying motion compensation or intra prediction to each block as a unit, thereby obtaining a predicted value 402 (vector quantity).

In an addition step 404, a differential value vector, which has been separately stored, is added to the predicted value. In the next clipping step 405, each vector element is clipped to be within a range of 0 . . . 255. The clipped data functions as original data for learning.

In a representative vector design step 406, representative vectors are designed using the original data for learning, by means of the LBG algorithm or the like.

Based on the occurrence probability of index information of the obtained representative vector, the relevant index is decoded in the quantization index decoding step 407.

In the next vector inverse-quantization step 408, a representative vector value corresponding to the index is obtained. The obtained value is output, and the relevant operation is completed.

Since the block structure of a decoding apparatus of the present embodiment can be easily analogized based on the explanation for the block diagram of the encoding apparatus in FIG. 14 and the explanation for the flowchart of the decoding shown in FIG. 15, explanation for the block structure of the decoding apparatus with reference to a drawing is omitted here.

Basically, the decoding apparatus has a structure similar to the block diagram of the encoding apparatus shown in FIG. 14, where the original pixel value storage memory 306 in FIG. 14 corresponds to a quantization index encoding data storage memory in the decoding apparatus; the vector quantizer 307 corresponds to a quantization index decoder in the decoding apparatus, and the quantization index encoder 308 corresponds to a vector inverse-quantizer in the decoding apparatus.

The above-described image or video encoding and decoding operation can also be implemented by a computer and a software program. Such a computer program may be provided by storing it in a computer-readable storage medium, or by means of a network.

INDUSTRIAL APPLICABILITY

In accordance with the present invention, when processing a difference between a predicted value and an original pixel value, no "absence of the predicted value as important information" in the conventional method occurs, but the predicted value is fully used for the encoding, thereby encoding an image (static image or video image) with a reduced amount of code.

The invention claimed is:

1. An image encoding method for encoding a pixel value of an encoding target by using a predicted value generated by means of spatial or temporal prediction using a previously-decoded image, the method comprising:
   a step that performs prediction of the pixel value of the encoding target and obtains the predicted value;
   a step that computes data of a probability distribution which indicates what value an original pixel value has for the obtained predicted value, by shifting, in accordance with the predicted value, difference distribution data of a difference between the original pixel value and the predicted value in predictive encoding, where the difference distribution data is stored in advance;
   a step that clips the obtained data of the probability distribution so as to contain the data in a range from a lower limit to an upper limit for possible values of the original pixel value;
   a step that encodes the pixel value of the encoding target by using the clipped data of the probability distribution of the original pixel value from the lower limit to the upper limit.

2. The image encoding method in accordance with claim 1, wherein:
   the prediction is performed in block units so that the pixel value of the encoding target is associated with a predetermined pixel block; and
   in the step of encoding the pixel value, a quantization representative vector is determined based on the data of the probability distribution, which is computed for a pixel block value obtained by block prediction, and the encoding is performed by subjecting the pixel block value to vector quantization.

3. An image decoding method for decoding a pixel value of a decoding target by using a predicted value generated by means of spatial or temporal prediction using a previously-decoded image, the method comprising:
   a step that performs prediction of the pixel value of the decoding target and obtains the predicted value;
   a step that computes data of a probability distribution which indicates what value an original pixel value has for the obtained predicted value, by shifting, in accordance with the predicted value, difference distribution data of a difference between the original pixel value and the predicted value in predictive encoding, where the difference distribution data is stored in advance;
   a step that clips the obtained data of the probability distribution so as to contain the data in a range from a lower limit to an upper limit for possible values of the original pixel value;
   a step that decodes the pixel value of the decoding target by using the clipped data of the probability distribution of the original pixel value from the lower limit to the upper limit.

4. The image decoding method in accordance with claim 3, wherein:
   the prediction is performed in block units so that the pixel value of the decoding target is associated with a predetermined pixel block; and
   in the step of decoding the pixel value, a quantization representative vector is determined based on the data of the probability distribution, which is computed for a pixel block value obtained by block prediction, and a vector-quantized pixel block value of the decoding target is decoded based on the determined quantization representative vector.

5. An image encoding apparatus for encoding a pixel value of an encoding target by using a predicted value generated by means of spatial or temporal prediction using a previously-decoded image, the apparatus comprising:
   a prediction device that performs prediction of the pixel value of the encoding target and obtains the predicted value;
   a device that computes data of a probability distribution which indicates what value an original pixel value has for the obtained predicted value, by shifting, in accordance with the predicted value, difference distribution data of a difference between the original pixel value and the predicted value in predictive encoding, where the difference distribution data is stored in advance;
   a device that clips the obtained data of the probability distribution so as to contain the data in a range from a lower limit to an upper limit for possible values of the original pixel value;
   an encoding device that encodes the pixel value of the encoding target by using the clipped data of the probability distribution of the original pixel value from the lower limit to the upper limit.

6. The image encoding apparatus in accordance with claim 5, wherein:
   the prediction device performs the prediction in block units so that the pixel value of the encoding target is associated with a predetermined pixel block; and
   the encoding device determines a quantization representative vector based on the data of the probability distribution, which is computed for a pixel block value obtained by block prediction, and performs the encoding by subjecting the pixel block value to vector quantization.

7. An image decoding apparatus for decoding a pixel value of a decoding target by using a predicted value generated by means of spatial or temporal prediction using a previously-decoded image, the apparatus comprising:
- a prediction device that performs prediction of the pixel value of the decoding target and obtains the predicted value;
- a device that computes data of a probability distribution which indicates what value an original pixel value has for the obtained predicted value, by shifting, in accordance with the predicted value, difference distribution data of a difference between the original pixel value and the predicted value in predictive encoding, where the difference distribution data is stored in advance;
- a device that clips the obtained data of the probability distribution so as to contain the data in a range from a lower limit to an upper limit for possible values of the original pixel value;
- a decoding device that decodes the pixel value of the decoding target by using the clipped data of the probability distribution of the original pixel value from the lower limit to the upper limit.

8. The image decoding apparatus in accordance with claim 7, wherein:
- the prediction device performs the prediction in block units so that the pixel value of the decoding target is associated with a predetermined pixel block; and
- the decoding device determines a quantization representative vector based on the data of the probability distribution, which is computed for a pixel block value obtained by block prediction, and decodes a vector-quantized pixel block value of the decoding target based on the determined quantization representative vector.

9. A non-transitory computer-readable storage medium which stores an image encoding program by which a computer executes the image encoding method in accordance with claim 1.

10. A non-transitory computer-readable storage medium which stores an image decoding program by which a computer executes the image decoding method in accordance with claim 3.

* * * * *